US012494076B2

(12) United States Patent
Kim et al.

(10) Patent No.: US 12,494,076 B2
(45) Date of Patent: Dec. 9, 2025

(54) EFFICIENT DOCUMENT INFORMATION EXTRACTION SYSTEM USING OPTICAL CHARACTER RECOGNITION (OCR) INFORMATION

(71) Applicant: SAP SE, Walldorf (DE)

(72) Inventors: Sohyeong Kim, Berlin (DE); Xiang Yu, Berlin (DE)

(73) Assignee: SAP SE, Walldorf (DE)

( * ) Notice: Subject to any disclaimer, the term of this patent is extended or adjusted under 35 U.S.C. 154(b) by 355 days.

(21) Appl. No.: 17/994,977

(22) Filed: Nov. 28, 2022

(65) Prior Publication Data

US 2024/0177515 A1  May 30, 2024

(51) Int. Cl.
*G06V 30/10* (2022.01)
*G06V 30/19* (2022.01)
*G06V 30/414* (2022.01)

(52) U.S. Cl.
CPC ...... *G06V 30/414* (2022.01); *G06V 30/19007* (2022.01)

(58) Field of Classification Search
CPC . G06V 30/414; G06V 30/19007; G06V 30/10
USPC ........................................................ 382/229
See application file for complete search history.

(56) References Cited

U.S. PATENT DOCUMENTS

| 6,928,411 | B1 * | 8/2005 | Fox ...................... G06Q 10/087 705/28 |
| 8,249,399 | B2 * | 8/2012 | Barkan ................ G06V 10/987 382/229 |
| 9,336,540 | B2 * | 5/2016 | Sobhani ................. G06Q 20/10 |
| 10,540,579 | B2 | 1/2020 | Reisswig et al. |
| 10,769,425 | B2 * | 9/2020 | Foncubierta Rodriguez ............... G06V 30/414 |
| 11,615,246 | B2 * | 3/2023 | Reisswig .............. G06F 16/367 704/9 |
| 2020/0082218 | A1 * | 3/2020 | Hoehne ..................... G06N 3/08 |
| 2021/0326589 | A1 * | 10/2021 | Schultz ............ G06V 30/19173 |

(Continued)

FOREIGN PATENT DOCUMENTS

CN        114170423     *  3/2022    ............... G06T 5/30

OTHER PUBLICATIONS

Katti, A.R. et al., "Chargrid: Towards Understanding 2D Documents," arXiv:1809.08799v1 [cs.CL], Sep. 24, 2018, 11 pages.

(Continued)

*Primary Examiner* — Beniyam Menberu
(74) *Attorney, Agent, or Firm* — Sterne, Kessler, Goldstein & Fox P.L.L.C.

(57) ABSTRACT

Embodiments are described for a system comprising a memory and at least one processor coupled to the memory. The at least one processor is configured to receive optical character recognition (OCR) information of a document and determine a beginning, inside, and outside (BIO) tags and labels of the one or more word boxes based on the OCR information. The at least one processor is further configured to group a first word box and a second word box based on BIO tags of the first and the second word boxes and merge the first and the second word boxes into a combined word box based on a label of the first word box matching a label of the second word box. Finally, the at least one processor is configured to output the combined word box and the label of the first word box.

17 Claims, 7 Drawing Sheets

(56) References Cited

U.S. PATENT DOCUMENTS

2022/0067275 A1\* 3/2022 Zeng .................. G06V 30/412

OTHER PUBLICATIONS

Vaswani, A. et al., "Attention Is All You Need," arXiv:1706.03762v5 [cs.CL], Dec. 6, 2017, 15 pages.
Xu, Y. et al., "LayoutLM: Pre-training of Text and Layout for Document Image Understanding," arXiv:1912.13318v5 [cs.CL], Jun. 16, 2020, 9 pages.

\* cited by examiner document:

Purchase Order: 38176237

| Item number | Description | Price | Quantity | Comment |
|---|---|---|---|---|
| 0001 | Work station, 8 core CPU, 32G RAM | 1700 | 1 | |
| 0002 | Ergonomic mouse | 80 | 1 | Urgent |
| 003 | Keyboard | 200 | 1 | | line tag: O
O
404 — B
406 — I
408 — O
410 — B
412 — B extracted line items

FIG. 4

EFFICIENT DOCUMENT INFORMATION EXTRACTION SYSTEM USING OPTICAL CHARACTER RECOGNITION (OCR) INFORMATION

BACKGROUND

An information extraction system may retrieve information from a document. The document can be a two-dimensional document, such as an invoice, a purchasing order, a receipt, and so on. For example, an invoice can include information of names of parties, invoice amount, date, itemized descriptions, addresses, etc. However, the information can be located in various positions of the invoice. For example, a statement date can be located on top of the invoice. A name and an address of a billing party can be located below the statement date. Therefore, it is challenging to locate and retrieve the information from the two-dimensional document.

SUMMARY

Some embodiments of this disclosure relate to apparatus, system, computer program product, and method embodiments for implementing an efficient document information extraction system.

Some embodiments of this disclosure provide a system comprising a memory and at least one processor coupled to the memory. The at least one processor is configured to receive optical character recognition (OCR) information of a document and determine beginning, inside, and outside (BIO) tags and labels of the one or more word boxes based on the OCR information. The OCR information corresponds to one or more word boxes. The at least one processor is further configured to group a first word box and a second word box based on BIO tags of the first and the second word boxes and merge the first and the second word boxes into a combined word box based on that a label of the first word box matches a label of the second word box. Finally, the at least one processor is configured to output the combined word box and the label of the first word box.

Some embodiments of this disclosure provide a method for extracting document information. The method comprises receiving, by one or more computing devices, optical character recognition (OCR) information of a document and determining, by the one or more computing devices, beginning, inside, and outside (BIO) tags and labels of the one or more word boxes based on the OCR information. The OCR information corresponds to one or more word boxes. The method further comprises grouping, by the one or more computing devices, a first word box and a second word box based on BIO tags of the first and the second word boxes and merging, by the one or more computing devices, the first and the second word boxes into a combined word box based on that a label of the first word box matches a label of the second word box. Finally, the method comprises outputting, by the one or more computing devices, the combined word box and the label of the first word box.

Some embodiments of this disclosure provide a non-transitory computer-readable medium (CRM) comprising instructions to, when executed by at least one computing device, causes the at least one computing device to perform operations to extract document information. The operations comprise receiving optical character recognition (OCR) information of a document and determining beginning, inside, and outside (BIO) tags and labels of the one or more word boxes based on the OCR information. The OCR information corresponds to one or more word boxes. The operations further comprise grouping a first word box and a second word box based on BIO tags of the first and the second word boxes and merging the first and the second word boxes into a combined word box based on that a label of the first word box matches a label of the second word box. Finally, the operations comprise outputting the combined word box and the label of the first word box.

This Summary is provided merely for the purposes of illustrating some embodiments to provide an understanding of the subject matter described herein. Accordingly, the above-described features are merely examples and should not be construed to narrow the scope or spirit of the subject matter in this disclosure. Other features, embodiments, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 4 illustrates an example of a line item grouping process, according to some embodiments of the disclosure.

Figure 1:
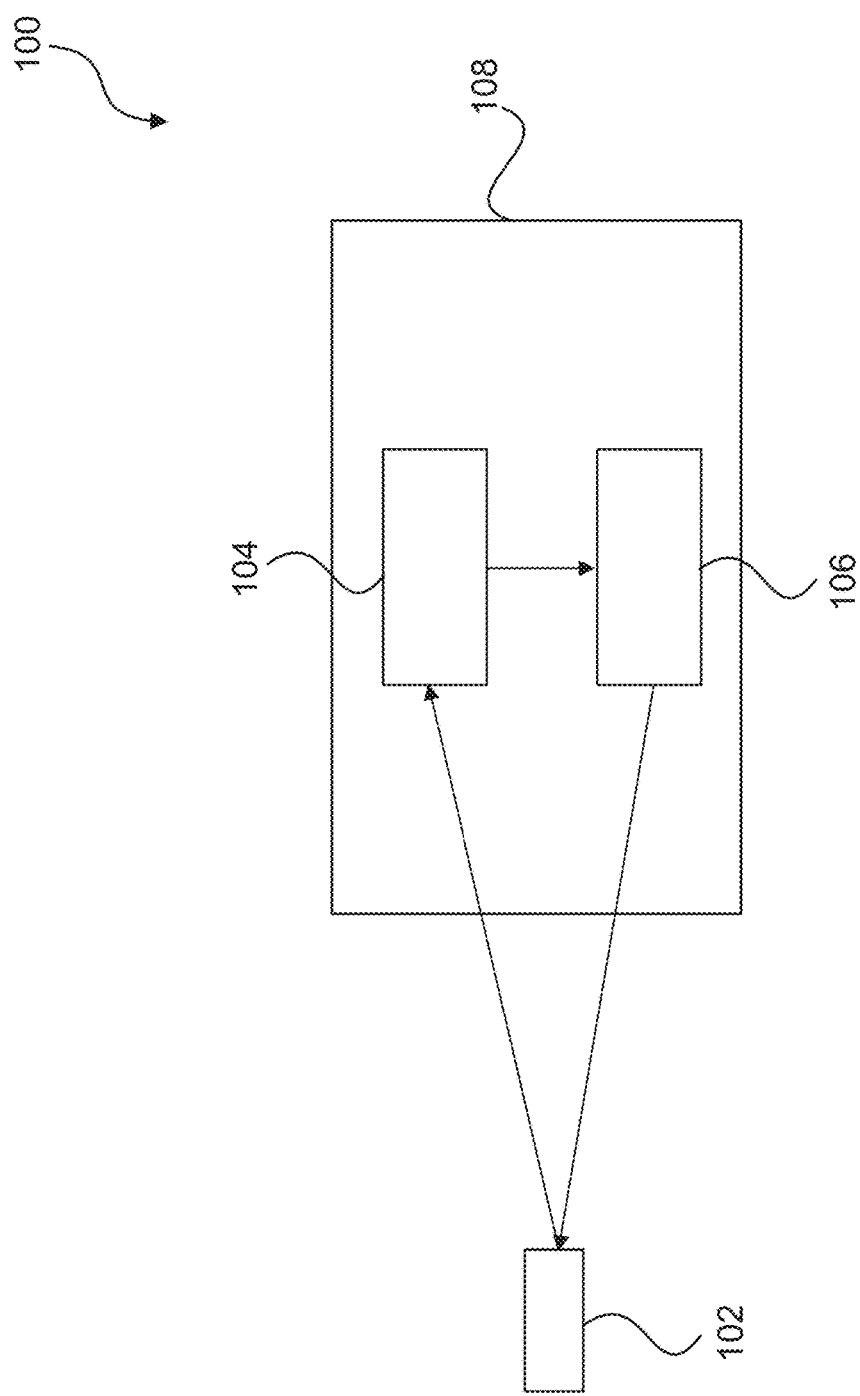
FIG. 1 illustrates an example system implementing an efficient document information extraction system, according to some embodiments of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments of this disclosure include apparatus, system, computer program product, and method embodiments for implementing an efficient document information extraction system.

In some embodiments, an information extraction system may retrieve information from a document. The document may be a two-dimensional (2D) document such as an invoice. The information extraction system may convert the 2D document into a sequence of words or characters and then analyze the sequence to extract information from the 2D document. However, in such a case, converting the 2D document into the sequence that is in one-dimension (1D) may have disadvantages. For example, the 2D document may have position information of words, which will be lost during a process of converting from the 2D document to the 1D sequence. For another example, the process of converting may require additional computational power/capacity and time to preprocess the 2D document. Such additional requirements would increase the cost and undermine the performance of the information extraction system. On the other hand, the information extraction system may process the 2D document via image processing models. However, the image processing models are normally complicated and require extensive training to be used. Thus, it is ideal to build the information extraction system based on an optical character recognition (OCR) tool. Specifically, the information extraction system may take OCR information produced by the OCR tool and extract the information from the OCR information. The OCR tool, such as a business OCR, is available off the shelves and efficient to run. Thus, the information extraction system does not require additional training processes or significantly higher computational resources or capacity to extract information from the document.

In some embodiments, the OCR information of the 2D document may correspond to word boxes. For example, an address printed on the 2D document can include a house number and a street name, such as "22 main street." The OCR tool may identify three word boxes from the address, which correspond to "22," "main," and "street," respectively. If the OCR tool outputs the word boxes directly to a user, the user may not be able to know their meanings. For example, if the number "22" is reported to the user, it is difficult to see that the number "22" is a house number. In some embodiments, the information extraction system can merge "22," "main," and "street" to form a combined word "22 main street." The user seeing the combined word may be able to understand that it is related to an address. Furthermore, the information extraction system may also give a label to the word boxes. For example, the combined word "22 main street" can be given a label "address." In such a case, the user, receiving the combined word "22 main street" and the corresponding label "address," would understand the meaning of the combined word and does not need to guess.

The OCR tool may also produce OCR information for each word box. For example, the OCR information of the word box with the word "main" may include the word "main" and a position of the word box. The information extraction system can group word boxes and assign labels to the word boxes. For example, the information extraction system can determine BIO tags assigned to the word boxes based on the OCR information and then perform a line item grouping process using the BIO tags. Specifically, the information extraction system can group a plurality of word boxes into one line item. The information extraction system can also determine labels assigned to the word boxes based on the OCR information. The information extraction system can then perform an instance merging process or a word box merging process using the labels. For example, a plurality of word boxes within one line item may share a common label. The information extraction system can combine the plurality of word boxes with the common label into a combined word box. Finally, the information extraction system can output the combined word box and the common label to the user.

FIG. 1 illustrates an example system 100 implementing an efficient document information extraction system, according to some embodiments of the disclosure. The example system 100 is provided for the purpose of illustration only and does not limit the disclosed embodiments. The example system 100 may include, but is not limited to, a user device 102 and a document processing system 108. The user device 102 may include, but is not limited to, laptops, desktops, personal computers, cloud servers, wireless communication devices, smartphones, tablets, personal assistants, monitors, televisions, wearable devices, Internet of Things (IoT) devices, vehicle communication devices, and the like. The document processing system 108 may include, but is not limited to, computer systems, servers, cloud systems, cloud servers, laptops, desktops, personal computers, and the like. In some embodiments, the document processing system 108 includes an OCR tool 104 and an information extraction system 106. The OCR tool 104 and the information extraction system 106 can be in a same computing device or different computing devices. In some embodiments, the document processing system 108 can be a business document processing system and the OCR tool 104 can be a business OCR tool.

In some embodiments, the user device 102 may upload a document to the document processing system 108. The user device 102 may transmit the document to the OCR tool 104. The document can be a 2D document, such as an invoice, a purchasing order, a receipt, and so on. The OCR tool 104 can process the document and identify one or more word boxes in the document. The OCR tool 104 can also produce word box information corresponding to each word box. For example, the word box information of a word box can include one or more words included in the word box, characters of the one or more words, and position information of the word box. The OCR tool 104 can then transmit OCR information to the information extraction system 106. The OCR information may include the identified one or more word boxes and their corresponding word box information.

In some embodiments, the information extraction system 106, upon receiving the OCR information, can further process the one or more word boxes. For example, the information extraction system 106 can determine BIO tags and labels of the one or more word boxes. Based on the BIO tags, the information extraction system 106 can group word boxes into line items. Within each line item, the information extraction system 106 can combine word boxes that share a common label into a combined word box. Finally, the information extraction system 106 can transmit the combined word boxes and their corresponding common labels to the user device 102.

Figure 2:
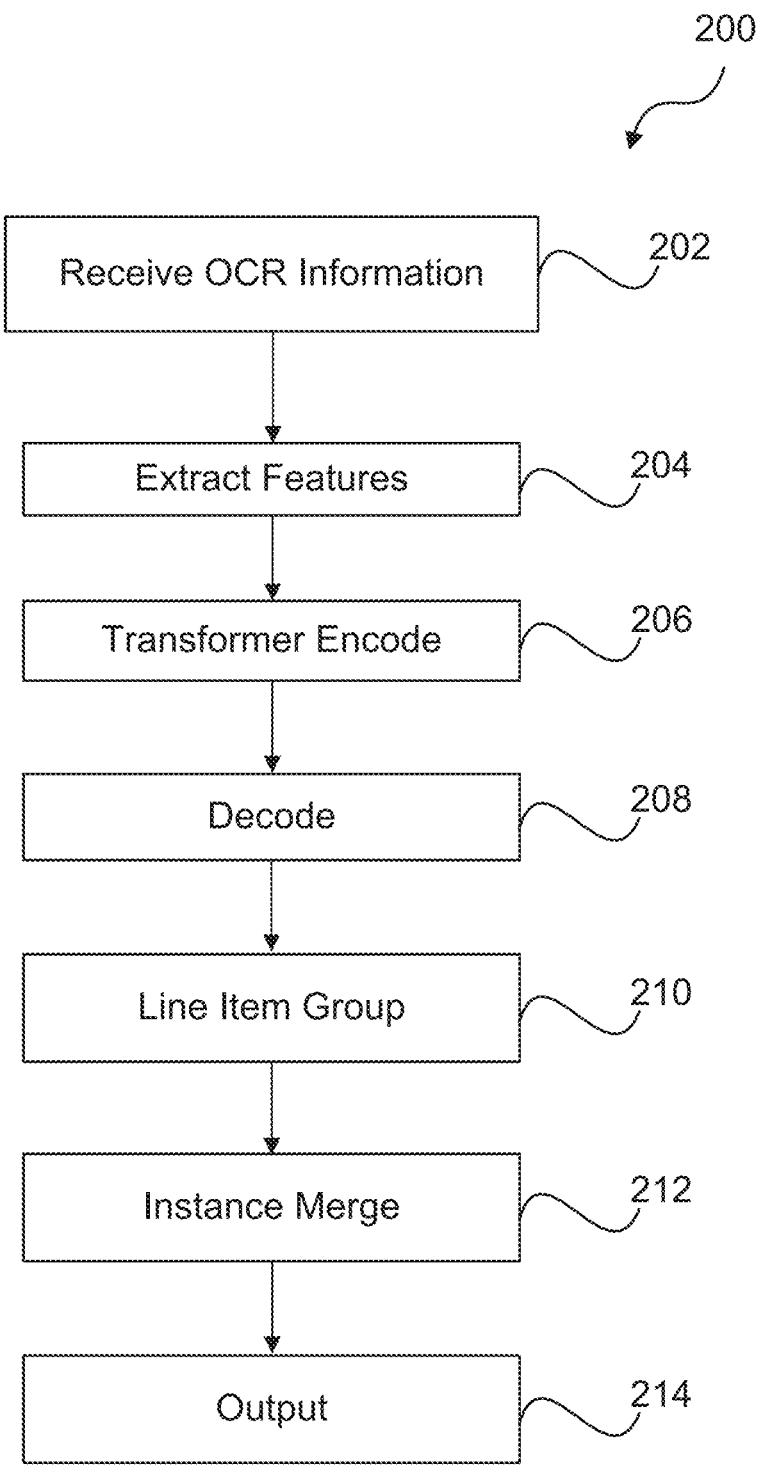
FIG. 2 illustrates an example method for extracting information from a document, according to some embodiments of the disclosure.

FIG. 2 illustrates example method 200 for extracting information from a document, according to embodiments of the disclosure. As a convenience and not a limitation, FIG. 2 may be described with regard to elements of FIGS. 1 and 7. The method 200 may represent the operation of devices (e.g., the information extraction system 106 in FIG. 1) implementing an efficient document information extraction system. The method 200 may also be performed by computer system 700 of FIG. 7. But the method 200 is not limited to the specific embodiments depicted in those figures and other systems may be used to perform the method, as will be understood by those skilled in the art. It is to be appreciated that not all operations may be needed, and the operations may not be performed in the same order as shown in FIG. 2.

At 202, an information extraction system, such as the information extraction system 106 in FIG. 1, receives OCR information of a 2D document from an OCR tool, such as the OCR tool 104 in FIG. 1. In some embodiments, the OCR tool can process the 2D document received from a user device, such as the user device 102 in FIG. 1, to produce the OCR information. The OCR information may identify one or more word boxes in the 2D document with corresponding word box information.

At 204, the information extraction system can extract features of each word box from the OCR information. For example, the features can include one or more words included in a word box, characters included in the word box, coordinates of the word box, and a relative position of the word box in the 2D document.

At 206, the information extraction system can process the features using a transformer encoder. For example, the information extraction system can convert the features into numerical vectors. Results produced by the transformer encoder, such as the numerical vectors, can be referred to as encoding results. In some embodiments, the transformer encoder may include an attention-based transformer model. The transformer encoder may include a vocabulary pool that includes one or more words and their corresponding numerical vector. For example, the information extraction system can use the vocabulary pool as a look-up table. In such a case, the information extraction system can convert a word into a numerical vector by checking the vocabulary pool. Thus, each word box of the 2D document may correspond to one or more numerical vectors. In some embodiments, the vocabulary pool is predetermined by a training process.

At 208, the information extraction system can process the one or more numerical vectors using decoders. For example, the information extraction system can feed one or more numerical vectors of a word box to a label decoder to obtain a label of the word box. Similarly, the information extraction system can also feed the one or more numerical vectors of the word box to a BIO tag decoder to obtain a BIO tag of the word box.

At 210, the information extraction system can perform line item grouping based on BIO tags of the word boxes in the 2D documents. For example, the information extraction system can group two word boxes into one line item. Details of the line item grouping process are also discussed below in FIGS. 4-6.

At 212, the information extraction system can perform instance merging of word boxes. For example, if the two word boxes grouped into one line item in step 210 share a common label, the information extraction system can combine the two word boxes into a combined word box. Details of the instance merging process are also discussed below in FIGS. 5 and 6.

At 214, the information extraction system output word boxes to the user device. In some embodiments, the output may include combined boxes and their labels.

Figure 3:
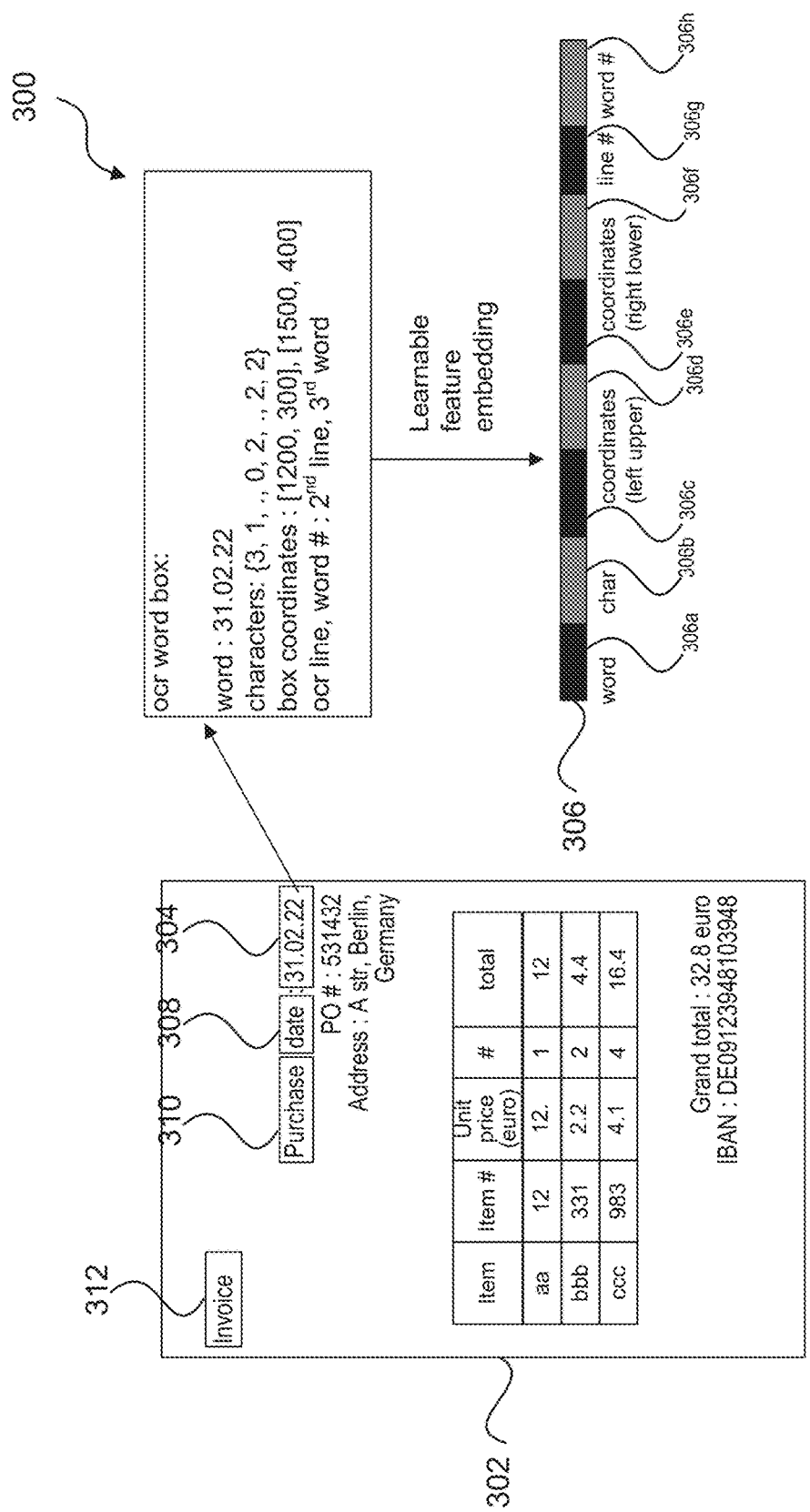
FIG. 3 illustrates an example of a document with optical character recognition (OCR) information, according to some embodiments of the disclosure.

FIG. 3 illustrates an example 300 of a document with OCR information, according to some embodiments of the disclosure. As a convenience and not a limitation, FIG. 3 may be described with regard to elements of FIGS. 1 and 7. The example 300 may represent the operation of devices (e.g., the information extraction system 106 in FIG. 1) implementing an efficient document information extraction system. The example 300 may also be performed by computer system 700 of FIG. 7. But the example 300 is not limited to the specific embodiments depicted in those figures and other systems may be used to perform the method, as will be understood by those skilled in the art. It is to be appreciated that not all operations may be needed, and the operations may not be performed in the same order as shown in FIG. 3.

In some embodiments, the example 300 includes an invoice 302. An OCR tool, such as the OCR tool 104 in FIG. 1, may process the invoice 302 and produce OCR information of the invoice 302. For example, the OCR information may indicate one or more word boxes, such as word boxes 312, 304, 308, and 310 shown in FIG. 3. In addition, the OCR information may also include word box information of each of the one or more word boxes. For example, the OCR information may include word box information of the word box 304, which appears to include a date of Feb. 31, 2022.

In some embodiments, the word box information may include four types of information. First, the word box information may include a word included in the word box 304. Here, the word in the word box 304 is 31.02.22. The word box 308, on the other hand, includes a word "date." Second, the word box information can include characters of the word. For example, the word box information of the word box 304 can include an array of characters that includes characters {3, 1, 0, 2, 2, 2}. Third, the word box information may include coordinates of the word box. For example, the coordinates may be a coordinate of the top-left corner of the word box and a coordinate of the bottom-right corner of the word box. As shown in FIG. 3, the coordinate of the top-left corner of the word box 304 is (1200, 300) and the coordinate of the bottom-right corner of the word box 304 is {1500, 400}. Fourth, the word box information may include a line number and a word number of the word box. For example, as shown in FIG. 3, the word box 312 is closest to the top of the invoice 302. Thus, the word box 312 in a first line of the invoice 302 and its line number is 1. The word boxes 310, 308, and 304 are in a same line and are just below the word box 312. Therefore, the word boxes 310, 308, and 304 are in a second line of the invoice 302 and their line number is 2. In addition, because the word box 304 is a third word box in the second line, its word number is 3. Thus, the OCR information may indicate that the line number of the word box 304 is 2 and the word number of the word box is 3.

In some embodiments, the OCR tool may transmit the OCR information, as described above, to an information extraction system, such as the information extraction system 106 in FIG. 1. The information extraction system may store the OCR information in a plurality of vectors. For example, the word is stored in a vector 306a and the characters are stored in a vector 306b. The box coordinates include four numbers and thus are stored in vectors 306c, 306d, 306e, and 306f. Finally, the line number and the word number are stored in vectors 306g and 306h, respectively. In some embodiments, each vector has a fixed size. For example, the vectors 306c, 306d, 306e, and 306f may have a size of four digits. In some embodiment, the OCR tool may concatenate the vectors 306a, 306b, 306c, 306d, 306e, 306f, 306g, and 306h to form a combined vector 306.

FIG. 4 illustrates an example 400 of a line item grouping process, according to some embodiments of the disclosure. As a convenience and not a limitation, FIG. 4 may be described with regard to elements of FIGS. 1 and 7. The example 400 may represent the operation of devices (e.g., the information extraction system 106 in FIG. 1) implementing an efficient document information extraction system. The example 400 may also be performed by computer system 700 of FIG. 7. But the example 400 is not limited to the specific embodiments depicted in those figures and other systems may be used to perform the method, as will be understood by those skilled in the art. It is to be appreciated that not all operations may be needed, and the operations may not be performed in the same order as shown in FIG. 4.

In some embodiments, the example 400 includes a purchasing order 402. As discussed in FIG. 3 above, the OCR tool may process the purchasing order 402 and produce OCR information. The OCR information can be sent to an information extraction system to assign BIO tags and labels to word boxes of the purchasing order 402. As shown in FIG. 4 and similar to FIG. 3, a plurality of word boxes may be in a same line. For example, a line 404 may include word boxes corresponding to words "0001," "Work," "station," "8," "core," "1700" and "1." As discussed above, the OCR information includes features of each word box and the information extraction system may assign BIO tags (or line tags) based on the features. Here, the word boxes in the line 404 share a BIO tag "B", which stands for beginning. In such a case, the information extraction system may determine that the BIO tag of the line 404 is "B." In some embodiment, the BIO tag "B" indicates that the current line is a first line of a line item. The purchasing order 402 also includes a line 406 that has a BIO tag "I," which stands for insider. In some embodiments, the BIO tag "I" indicates that the current line is inside a line item. Thus, the line 404 forms the first line of a first line item and the line 406 forms a second line of the first line item. In such a case, the information extraction system may group the word boxes in the lines 404 and 406 together as the first line item. The information extraction system can further check a line below the line 406 to see if more lines can be grouped into the first line item. Here, a line 408 is the next line. However, the line 408 has a BIO tag "O," which stands for outside. In some embodiments, the BIO tag "O" indicates that the current line is not a part of any line items. Thus, the line 408 is not a part of the first line item and the information extraction system can determine that the first line item has two lines, i.e., the line 404 and 406, and no more. In some embodiments, the information extraction system may determine that lines 410 and 412 form a second and a third line items, respectively, because they have the BIO tag "B" and are not followed by a line with the BIO tag "I."

In some embodiments, word boxes of a line may correspond to different BIO tags. For example, in the line 410, the word boxes "0002," "Ergonomic," and "mouse" may correspond to the BIO tag "B." However, the word box "80" may correspond to the BIO tag "I" and the word box "I" may correspond to the BIO tag "O." In such a case, the information extraction system can determine a BIO tag the line based on a majority voting. For example, because the majority of the word boxes in the line 410 correspond to the BIO tag "B," the information extraction system may determine that the BIO tag of the line 410 to be "B." In other words, the BIO tags of the word boxes "80" and "1" are ignored because they are minorities.

In some embodiments, the information extraction system can extract the first, the second, and the third line items for further processing. For example, the information extraction system can perform the instance merging process based on the extracted line items, as discussed in step 212 and in FIGS. 5 and 6 below with more details.

Figure 5:
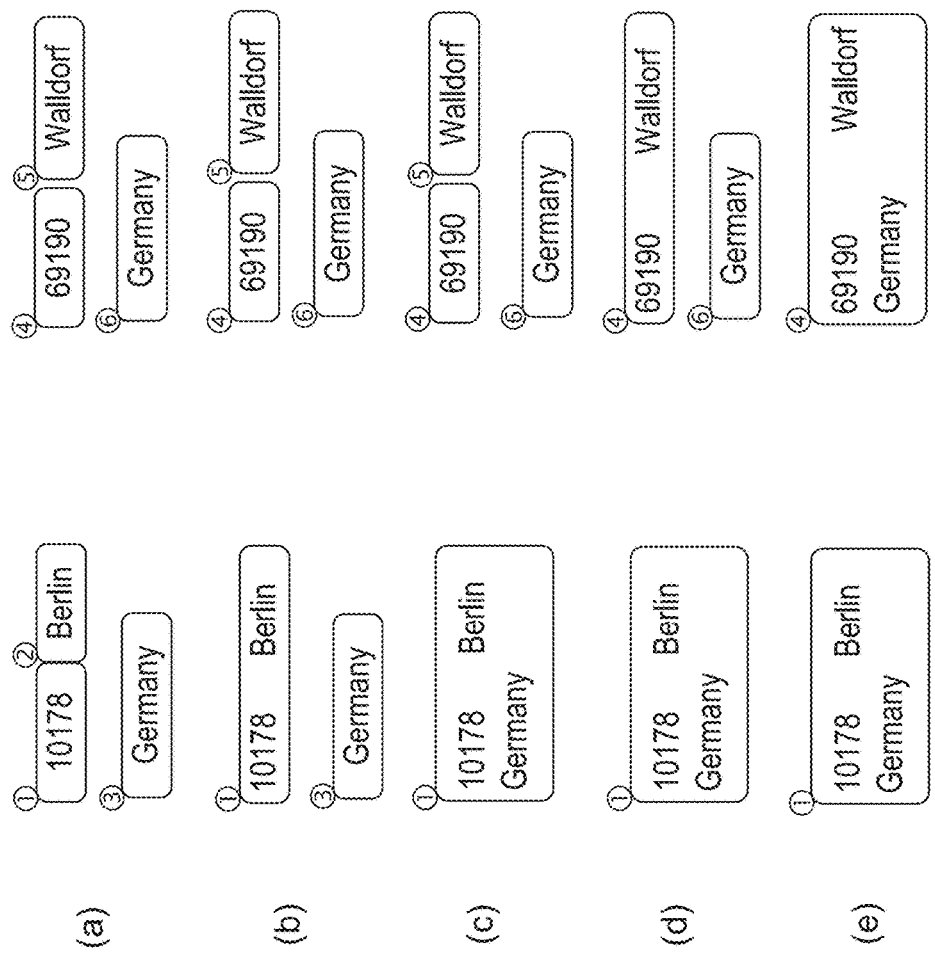
FIG. 5 illustrates an example of an instance merging process, according to embodiments of the disclosure.

FIG. 5 illustrates an example 500 of an instance merging process, according to some embodiments of the disclosure. As a convenience and not a limitation, FIG. 5 may be described with regard to elements of FIGS. 1 and 7. The example 500 may represent the operation of devices (e.g., the information extraction system 106 in FIG. 1) implementing an efficient document information extraction system. The example 500 may also be performed by computer system 700 of FIG. 7. But the example 500 is not limited to the specific embodiments depicted in those figures and other systems may be used to perform the method, as will be understood by those skilled in the art. It is to be appreciated that not all operations may be needed, and the operations may not be performed in the same order as shown in FIG. 5.

In some embodiments, the example 500 includes six word boxes. As discussed above in FIG. 4, the six word boxes may be grouped into a line item. In some embodiments, the information extraction system can assign labels to each of six word boxes and merge word boxes with common labels and at close distances. Here, all six word boxes are assigned with a label "address." Therefore, the information extraction system can merge the six word boxes that are close to each other. In other embodiments, the six word boxes may belong to none of line items and thus they are non-grouped word boxes. In such a case, the information extraction system can also merge the six word boxes if they share common labels and are at close distances. In summary, word boxes may merge together if one of two conditions is met: (1) they are grouped into a same line item; or (2) none of the word boxes are grouped into any line item. The information extraction system may determine if one of two conditions is met before merging the word boxes.

In step (a), the six boxes are by themselves. Positions of the six boxes are shown in step (a) of FIG. 5.

In step (b), the information extraction system can combine the word boxes (1) and (2). In some embodiments, the information extraction system may determine that the word boxes (1) and (2) are close to each other. For example, the information extraction system may determine a first center point of the word box (1) and a second center point of the word box (2). The information extraction system may then determine that a distance between the first and the second center points is below a threshold value. In such a case, the information extraction system can merge the word box (2) into the word box (1). In some embodiments, coordinates of the center point can be calculated using coordinates of corner points. For example, the information extraction system may determine coordinates of a center point of the word box 304 of FIG. 3 by averaging the coordinates of the top-left corner point and the bottom-right corner point. In such a case, the information extraction system may determine that the coordinates of the center point of the word box 304 are {1350, 350}.

In some embodiments, the information extraction system may determine whether two word boxes are close to each other based on their shortest distance. For example, regarding the word box (2) and a word box (6) in FIG. 5, the information extraction system may determine that a first point in the word box (2) and a second point in the word box (6) have a shorter distance than any other pairs of points in the word boxes (2) and (6). The information extraction system may determine that the shortest distance between the word boxes (2) and (6) is the distance between the first point of the word box (2) and the second point of the word box (6). If the shortest distance is smaller than a second threshold value, the information extraction system may merge the word boxes (2) and (6). Here, the information extraction system may determine that the first point of the word box (2) is a bottom-right corner of the word box (2) and that the second point of the word box (6) is a top-left corner of the word box (6).

In step (c), the information extraction system may determine that the merged word box (1) is close to the word box (3) and merge the word box (3) into the merged word box (1). In such a case, the merged word box (1) now contains words "10178," "Berlin," and "Germany," which form an address of an area.

Similarly in steps (d) and (e), the information extraction system may merge a word box (5) into a word box (4), and then merge the word box (6) into the merged word box (4). In other words, after step (e), the line item contains two word boxes, instead of six. The information extraction system may determine that the merged word boxes (1) and (4) are not close to each other and decide not to merge them. For example, the information extraction system may determine that a distance between center points of the merged word boxes (1) and (4) is above the threshold value. For another example, the information extraction system may determine that a distance between a top-right corner of the merged word box (1) and a top-left corner of the merged word box (4), which is a shortest distance between the merged word boxes (1) and (4), is above the second threshold. In either case, the information extraction system may refrain from merging the merged word boxes (1) and (4). Because there are no more word boxes to merge, the instance merging process completes after step (e).

Figure 6:
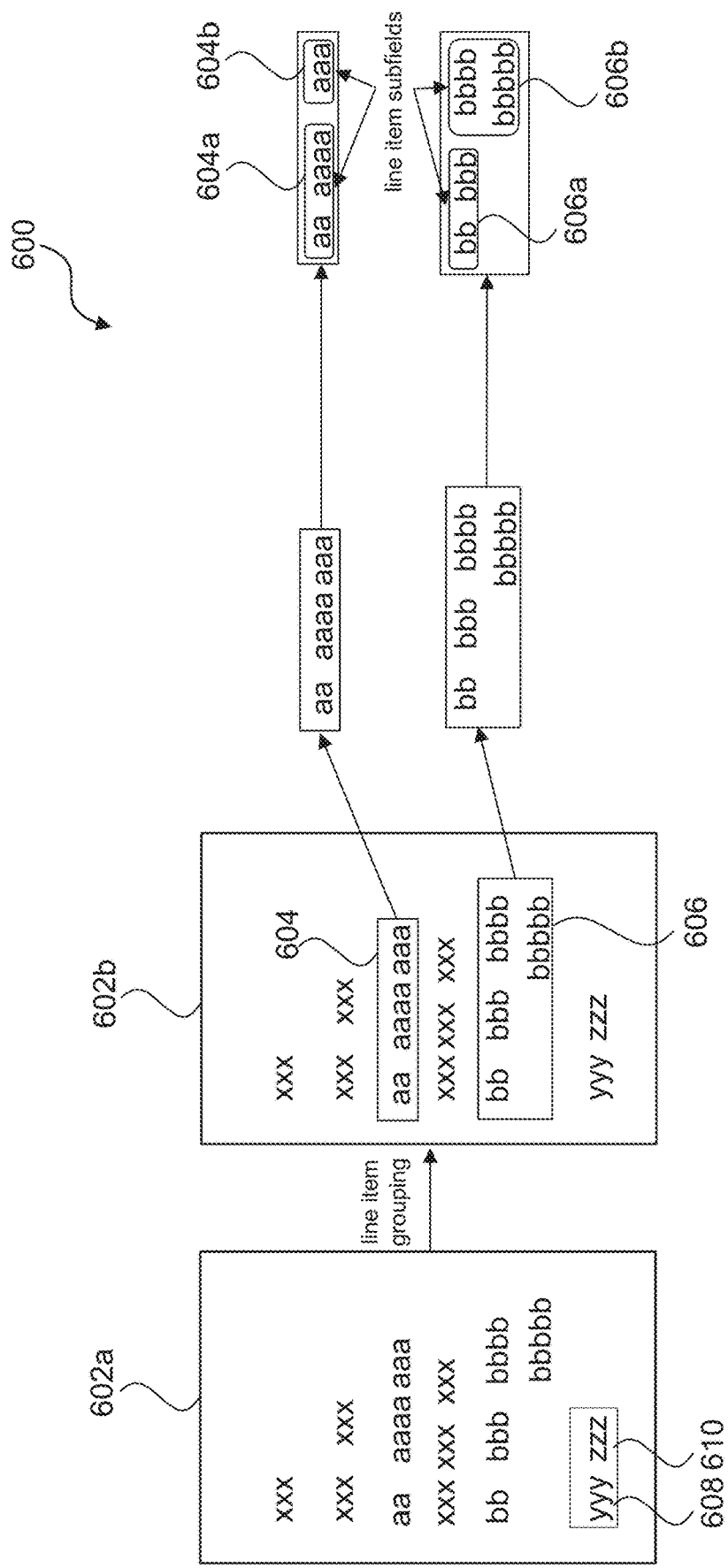
FIG. 6 illustrates an example of a word aggregating process, according to embodiments of the disclosure.

FIG. 6 illustrates an example 600 of a word aggregating process, according to some embodiments of the disclosure. As a convenience and not a limitation, FIG. 6 may be described with regard to elements of FIGS. 1 and 7. The example 600 may represent the operation of devices (e.g., the information extraction system 106 in FIG. 1) implementing an efficient document information extraction system. The example 600 may also be performed by computer system 700 of FIG. 7. But the example 600 is not limited to the specific embodiments depicted in those figures and other systems may be used to perform the method, as will be understood by those skilled in the art. It is to be appreciated that not all operations may be needed, and the operations may not be performed in the same order as shown in FIG. 6.

In some embodiments, the example 600 includes a 2D document 602*a*. The 2D document 602*a* can be an invoice, a purchasing order, or other types of 2D documents. Similar to the discussion above, the OCR tool may process the 2D document 602*a* and identify one or more word boxes alone with their word box information. For example, the OCR tool may identify word boxes with words "aa," "aaa," "aaaa," "bb," "bbb," "bbbb," and "bbbbb." The information extraction system may assign BIO tags and labels to the word boxes in the 2D document 602*a*. In addition, the information extraction system may perform a line item grouping process, as described above, to convert the 2D document 602*a* to a 2D document 602*b*, wherein the word boxes in the 2D document 602*b* are grouped into line items. For example, the word boxes with the words "aa," "aaa," and "aaaa." are grouped into a line item 604. The word boxes with the words "bb," "bbb," "bbbb," and "bbbbb" are grouped into a line item 606.

In some embodiments, the information extraction system may merge word boxes having a common label in each line item. For example, the word boxes with words "aa" and "aaaa" in the line item 604 may have a first label. In such a case, the information extraction system merges the two word boxes into a combined word box 604*a*. A word box 604*b* may have a second label and thus is not merged with the combined word box 604*a*. Similarly, the information extraction system may merge word boxes in the line item 606 into a word box 606*a* and a word box 606*b*, respectively. In some embodiment, the information extraction system further determines to merge two word boxes based on a distance between the two word boxes, as discussed above.

In some embodiments, the information extracting system may group word boxes that do not belong to any line items. For example, the word boxes 608 and 610 may be in tables or sections of a table that are different from any other word boxes. Thus, the word boxes 608 and 610 are not grouped into any line item. In such a case, as discussed above in FIG. 5, the information extracting system may merge the word boxes 608 and 610 if they have a same label and they are close to each other. Phrased differently, because the word boxes 608 and 610 are not grouped into any line item, the information extraction system may treat them as they are effectively grouped into a non-grouping line item.

Figure 7:
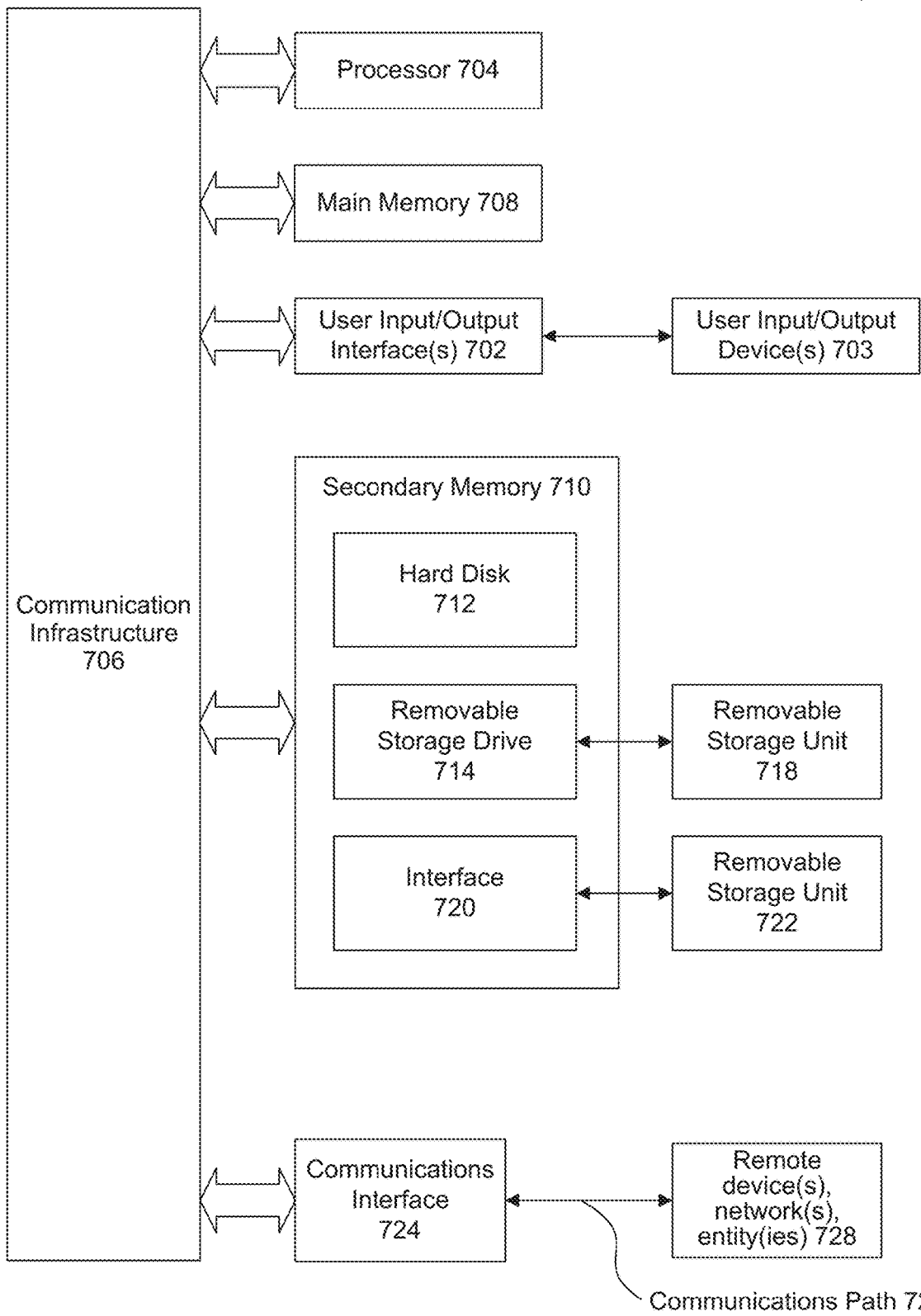
FIG. 7 is an example computer system for implementing some embodiments of the disclosure or portion(s) thereof.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for extracting document information, comprising:

receiving, by communication interfaces of one or more computing devices over a wired or wireless communication path, optical character recognition (OCR) information of a document, wherein the OCR information corresponds to one or more word boxes;

determining, by the one or more computing devices, beginning, inside, and outside (BIO) tags and labels of the one or more word boxes based on the OCR information;

grouping, by the one or more computing devices, a first word box and a second word box based on BIO tags of the first and the second word boxes, wherein the first word box corresponds to a beginning tag and the second word box corresponds to an inside tag;

determining that a distance between a first center point of the first word box and a second center point of the second word box is smaller than a predetermined value;

in response to determining that the distance is smaller than the predetermined value, merging, by the one or more computing devices, the first and the second word boxes into a combined word box based on a label of the first word box matching a label of the second word box; and outputting, by the one or more computing devices, the combined word box and the label of the first word box.

2. The computer-implemented method of claim 1, wherein the determining the BIO tags and the labels of the one or more word boxes further comprises:

retrieving one or more features of the one or more word boxes based on the OCR information;

feeding the one or more features to a transformer encoder to obtain encoding results;

feeding the encoding results to a BIO tag decoder to obtain the BIO tags of the one or more word boxes; and feeding the encoding results to a label decoder to obtain the labels of the one or more word boxes.

3. The computer-implemented method of claim 2, wherein the transformer encoder comprises an attention-based transformer model.

4. The computer-implemented method of claim 2, wherein the encoding results are numerical vectors.

5. The computer-implemented method of claim 2, wherein the one or more features comprise words, characters, box coordinates, OCR line number, and/or OCR word number.

6. The computer-implemented method of claim 1, wherein the BIO tags comprise beginning tags, inside tags, and outside tags.

7. A system, comprising:
a communication interface;
a memory; and
at least one processor coupled to the memory and configured to:
receive, using the communication interface, optical character recognition (OCR) information of a document over a wired or wireless communication path, wherein the OCR information corresponds to one or more word boxes;
determine beginning, inside, and outside (BIO) tags and labels of the one or more word boxes based on the OCR information;
group a first word box and a second word box based on BIO tags of the first and the second word boxes, wherein the first word box corresponds to a beginning tag and the second word box corresponds to an inside tag;
determine that a distance between a first center point of the first word box and a second center point of the second word box is smaller than a predetermined value;
in response to determining that the distance is smaller than the predetermined value, merge the first and the second word boxes into a combined word box based on a label of the first word box matching a label of the second word box; and
output the combined word box and the label of the first word box.

8. The system of claim 7, wherein to determine the BIO tags and the labels of the one or more word boxes, the at least one processor is configured to:

retrieve one or more features of the one or more word boxes based on the OCR information;

feed the one or more features to a transformer encoder to obtain encoding results;

feed the encoding results to a BIO tag decoder to obtain the BIO tags of the one or more word boxes; and feed the encoding results to a label decoder to obtain the labels of the one or more word boxes.

9. The system of claim 8, wherein the transformer encoder comprises an attention-based transformer model.

10. The system of claim 8, wherein the encoding results are numerical vectors.

11. The system of claim 8, wherein the one or more features comprise words, characters, box coordinates, OCR line number, and/or OCR word number.

12. The system of claim 7, wherein the BIO tags comprise beginning tags, inside tags, and outside tags.

13. A non-transitory computer-readable device having instructions stored thereon that, when executed by at least one computing device, cause the at least one computing device to perform operations to extract document information, the operations comprising:

receiving, using a communication interface of the at least one computing device, optical character recognition (OCR) information of a document over a wired or wireless communication path, wherein the OCR information corresponds to one or more word boxes;

determining beginning, inside, and outside (BIO) tags and labels of the one or more word boxes based on the OCR information;

grouping a first word box and a second word box based on BIO tags of the first and the second word boxes, wherein the first word box corresponds to a beginning tag and the second word box corresponds to an inside tag;

determining that a distance between a first center point of the first word box and a second center point of the second word box is smaller than a predetermined value;

in response to determining that the distance is smaller than the predetermined value, merging the first and the second word boxes into a combined word box based on a label of the first word box matching a label of the second word box; and outputting the combined word box and the label of the first word box.

14. The device of claim 13, wherein the determining the BIO tags and the labels of the one or more word boxes further comprises:

retrieving one or more features of the one or more word boxes based on the OCR information;

feeding the one or more features to a transformer encoder to obtain encoding results;

feeding the encoding results to a BIO tag decoder to obtain the BIO tags of the one or more word boxes; and feeding the encoding results to a label decoder to obtain the labels of the one or more word boxes.

15. The device of claim 14, wherein the transformer encoder comprises an attention-based transformer model.

16. The device of claim 14, wherein the encoding results are numerical vectors.

17. The device of claim 14, wherein the one or more features comprise words, characters, box coordinates, OCR line number, and/or OCR word number.

* * * * *